(12) United States Patent
Chang

(10) Patent No.: US 6,631,037 B2
(45) Date of Patent: Oct. 7, 2003

(54) RETROFOCUS-TYPE LENS SYSTEM

(75) Inventor: Kuo-Wen Chang, Ban Chiau (TW)

(73) Assignee: NuCam Corporation (TW)

( * ) Notice: Subject to any disclaimer, the term of this patent is extended or adjusted under 35 U.S.C. 154(b) by 73 days.

(21) Appl. No.: 10/066,752

(22) Filed: Feb. 6, 2002

(65) Prior Publication Data
US 2003/0090815 A1 May 15, 2003

(30) Foreign Application Priority Data
Nov. 6, 2001 (TW) .................................. 90127465 A

(51) Int. Cl.⁷ .............................................. G02B 13/04
(52) U.S. Cl. ........................................ 359/749; 359/753
(58) Field of Search ................................. 359/793, 761, 359/762, 752, 740, 736, 749, 753

(56) References Cited
U.S. PATENT DOCUMENTS 5,557,473 A * 9/1996 Sugiyama et al. .......... 359/752
6,404,564 B1 * 6/2002 Yamada ...................... 359/749

* cited by examiner

Primary Examiner—Ricky Mack
Assistant Examiner—Alicia M. Harrington
(74) Attorney, Agent, or Firm—Bacon & Thomas PLLC

(57) ABSTRACT

A retrofocus-type lens system comprises, in order of the object side, three lens units wherein the first lens unit serves as the front lens group of negative refractive power and the second lens unit in combination with the third lens unit serves as the rear lens group of positive refractive power. The first lens unit has meniscus lens elements with concave surfaces on the object side. A stop is placed between the front lens group including the meniscus lens elements and the rear lens group including both the second and the third lens units. The lens element on the image side of the first lens unit of the front lens group is of negative power, and the lens element on the image side of the third lens unit is a negative biconcave lens.

10 Claims, 10 Drawing Sheets

RETROFOCUS-TYPE LENS SYSTEM

BACKGROUND OF THE INVENTION

1. Field of the Invention

The present invention relates to a lens system suitable for low-cost and high-efficient digital cameras having megapixel resolution over 3 million pixels, particularly to a retrofocus-type lens system.

2. Description of the Prior Art

In digital cameras, the pixel size of the electronic image sensor is generally smaller than that of the image detecting area of the films employed in the traditional cameras. To compete with the traditional cameras in the 'wide-angle' effect, the lens system of digital cameras needs to be scaled down in accordance with the dimensional proportion of the image sensor of digital cameras to the film of the traditional cameras. The decrease in the size of the lens results in the increase in the radius of curvature of the respective surface of the lenses, and thus, the degree of the image distortion increases and the image quality becomes poor. It is therefore necessary to reduce the size of the aperture (F-stop) to eliminate the light around the lens system. The decrease of the F-stop will increase the diffraction limited circle which causes the image to become blurred. Smaller dimensions and bigger aperture are technical trend for designing digital cameras. As the dimension of the digital cameras is gradually scaled down, the space for positioning an optical filter and an image sensor behind the lens system is narrowed accordingly. In this light, a lens system of high resolution with an appropriate space between the lens system and the image sensor behind the lens system is required for modern digital cameras.

The prior art has used a retrofocus-type lens system to maintain the effective focal length of the digital cameras and to increase the back focal length of the digital cameras, as disclosed in U.S. Pat. Nos. 5,796,528 and 6,057,971. In general, the retrofocus lens system consists of front and rear lens groups. The front lens group of the retrofocus system from the most object side has negative refractive power and the rear lens group has positive refractive power. A stop is placed between the front lens group and the rear lens group. The back focal length of this type of lens system is generally extensible to a certain distance which even exceeds the effective focal length of the lens system. In addition, the aperture must be sufficiently enlarged to provide the desired resolution, as disclosed in U.S. Pat. No. 5,513,046.

The conventional retrofocus type lens system of the digital cameras requires a significant number of lenses to meet the market trend for high resolution of image. Accordingly, not only the lens system becomes complicated but also the space for arranging the optical filter and the image sensor is limited. Moreover, the cost and the yield resulting from such complicated lenses are disadvantageous in terms of manufacture. In addition, an unsymmetrical retrofocus lens system will tend to worsen image distortion including field curvature, astigmatism and lateral color in aesthetic sense because of the individual light path of different wavelengths entering into the lens system. Effective reduction of the degree of image distortion has become an important factor for lens design of the digital cameras.

SUMMARY OF THE INVENTION

It is therefore an object of the present invention to provide a retrofocus-type lens system to reduce the degree of image distortion.

It is a further object of the present invention to provide a retrofocus-type lens system for low-cost and high-efficient digital cameras having high pixel resolution.

It is another object of the present invention to provide a lens system including three pairs of lens units to reduce the degree of image distortion of the digital cameras.

The lens system in accordance with the present invention comprises three pairs of lens units wherein the first lens unit from the most object side serves as the front lens group with negative refractive power of the retrofocus-type lens system and the second lens unit in combination with the third lens unit serves as the rear lens group with positive refractive power of the retrofocus-type lens system. The lens elements of the first lens unit are meniscus toward the object side. A stop is placed between the front lens group including the first lens unit and the rear lens group including the second and the third lens units. The first lens unit of the front lens group has a negative lens element to the image side. The third lens unit has a negative biconcave lens element to the image side.

BRIEF DESCRIPTION OF THE DRAWINGS

A detailed description of various embodiments of the present invention is given below, with reference to the drawings.

FIG. 2-1 shows the field curvature in both the sagittal S and tangential T planes, distortion and lateral color of the embodiment of FIG. 2.

FIG. 2-2 shows a transverse ray fan plot, indicating the deviation of the reference image points taken according to the embodiment of FIG. 2.

FIG. 3-1 shows the field curvature in both the sagittal S and tangential T planes, distortion and lateral color of the embodiment of FIG. 3.

FIG. 3-2 shows a transverse ray fan plot, indicating the deviation of the reference image points taken according to the embodiment of FIG. 3.

FIG. 4-1 shows the field curvature in both the sagittal S and tangential T planes, distortion and lateral color of the embodiment of FIG. 4.

FIG. 4-2 shows a transverse ray fan plot, indicating the deviation of the reference image points taken according to the embodiment of FIG. 4.

DESCRIPTION OF THE PREFERRED EMBODIMENTS

Figure 1:
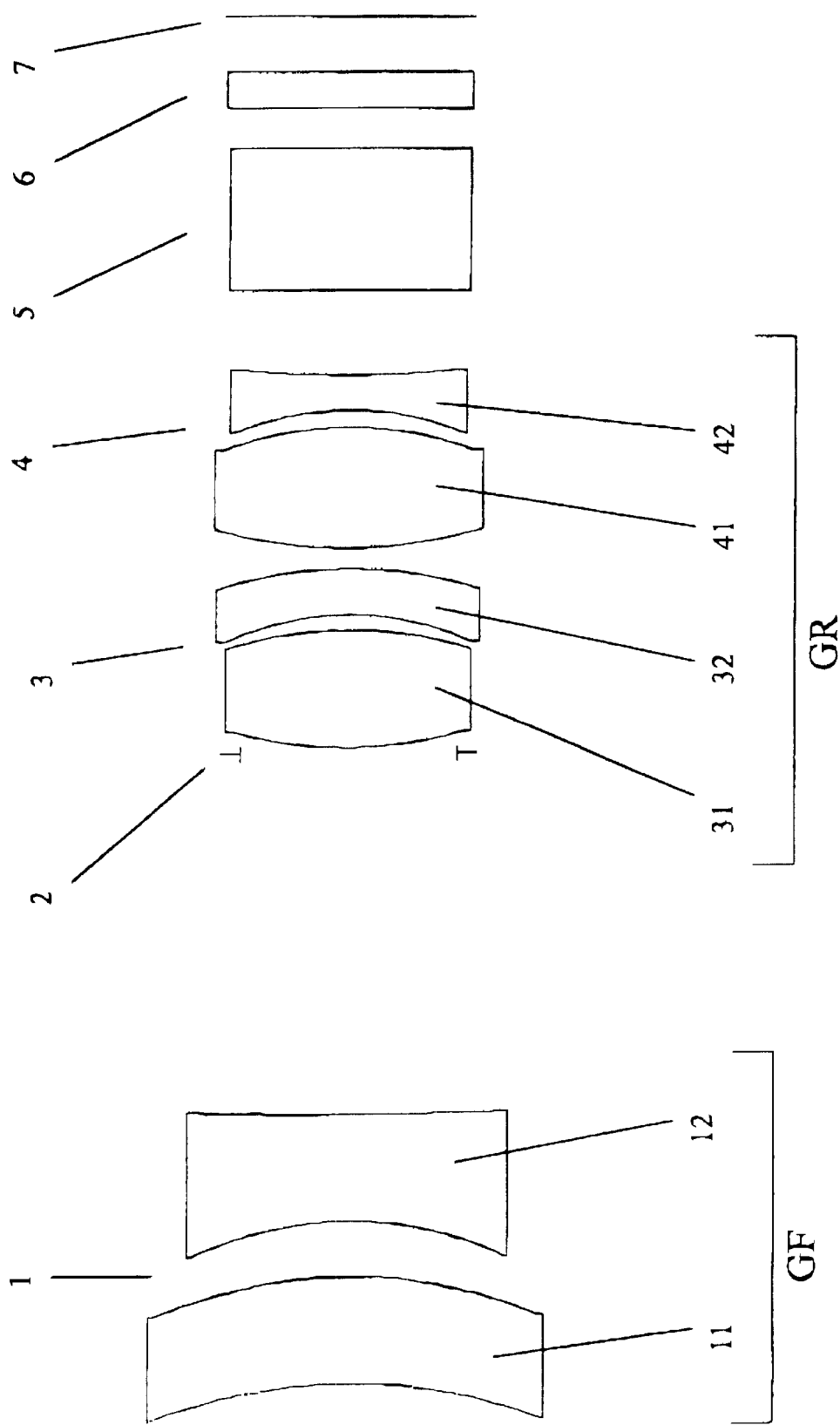
FIG. 1 shows the basic lens unit configuration of the retrofocus-type lens system according to the present invention.

Referring initially to FIG. 1, the retrofocus-type lens system in accordance with the present invention comprises three lens units 1, 3, 4 in digital cameras or the like. The first lens unit 1 located nearest to the object side includes a first lens element 11 and a second lens element 12, both of which are meniscus having a concave surface to the object side. The first lens unit 1 serves as the front lens group GF of the retrofocus-type lens system of the present invention, and thus, is of negative refractive power. The second lens unit 3 includes a third lens element 31 and a forth lens element 32 while the third lens unit 4 includes a fifth lens element 41 and a sixth lens element 42. The second lens unit 3 in combination with the third lens unit 4 serves as the rear lens group GR of the retrofocus-type lens system, and therefore, is of positive refractive power. A stop 2 is mounted between the front lens group GF including the first lens unit 1 and the rear lens group GR including the second lens unit 3 and the third lens unit 4. An optical filter 5 and an image sensor 6 are subsequently mounted in the space between the third lens unit 4 and an image plane 7 behind the third lens unit 4. The image sensor 6 is a charge-coupled device (CCD), complementary metal oxide semiconductor (CMOS) or the like component, and preferably, is a CCD component.

According to the design of the present invention, the retrofocus-type lens system satisfies the following conditions:

$$-2.7 < f1/f < -1.6$$

$$1 < f2/f < 2$$

$$2.6 < f3/f < 17$$

where f is the effective focal length of the retrofocus-type lens system, f1 is the focal length of the first lens unit 1, f2 is the focal length of the second lens unit 3, and f3 is the focal length of the third lens unit 4.

In accordance with the preferred embodiments of the present inventions, the three lens units 1,3,4 are respectively formed by a pair of lens elements made of flint glass and crown glass. Preferably, the first lens element 11 of the first lens unit 1, the forth lens element 32 of the second lens unit 3 and the sixth lens element 42 of the third lens unit 4 are made of flint glass, and also, the second lens element 12 of the first lens unit 1, the third lens element 31 of the second lens unit 3 and the fifth lens element 41 of the third lens unit 4 are made of crown glass. In addition, the second lens element 12 and the sixth lens element 42 are negative lenses. The third lens element 31 and the fifth lens element 41 are positive lenses.

Several specific embodiments of the retrofocus-type lens system according to the present invention will now be set forth in detail.

Embodiment 1

The data listed in Table 1 below represent the surface number S in order from the object side, the radius of curvature R (in mm) of each said surface, the refractive index ($N_d$) and Abbe number ($V_d$) of each lens element according to embodiment 1 of the present invention. The data below Table 1 represent the focal length of the lens, the F-number value (F/No.) and the image angel 2w, as well as the specific values obtained for the above-mentioned conditions of this embodiment.

TABLE 1

| S | R | $N_d$ | $V_d$ |
|---|---|---|---|
| 1 | −10.403 | 1.7552 | 27.1 |
| 2 | −9.498 | | |

TABLE 1-continued

| S | R | $N_d$ | $V_d$ |
|---|---|---|---|
| 3 | −7.255 | 1.6127 | 58.6 |
| 4 | 95.971 | | |
| 5 | 7.578 | 1.6127 | 58.6 |
| 6 | −7.682 | | |
| 7 | −5.307 | 1.7552 | 27.6 |
| 8 | −7.835 | | |
| 9 | 8.780 | 1.6127 | 58.6 |
| 10 | −6.920 | | |
| 11 | −5.771 | 1.7552 | 27.6 |
| 12 | 21.458 | | | f = 6.00　　　　F/NO. = 2.6
2w = 52 degrees　　f1/f = −1.98
f2/f = 1.50　　　f3/f = 16.73

As clearly shown in Table 1, the retrofocus-type lens system for the digital cameras relating to this embodiment satisfies all the above-mentioned conditions; the total length of this embodiment is 28.58 mm; the largest F-number value is 2.6 (thus better controlling for image exposure); and the image angle 2w is 52 degrees of wide angle.

Figure 2:
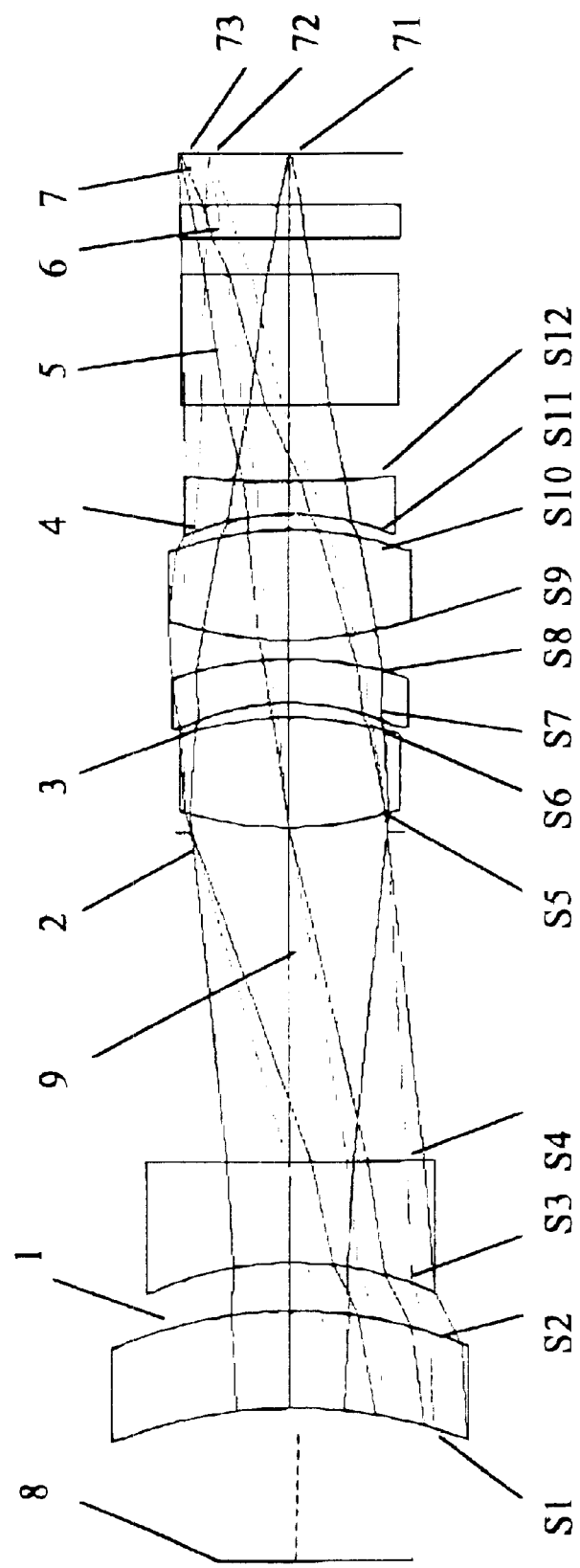
FIG. 2 shows a ray tracing diagram according to embodiment 1 of the present invention, wherein the reference image points focused on an image plane are taken from the light rays passing through an object at the positions of the optical axis, seven-tenths of the object measured from the optical axis and the edge of the object.
Figures 1, 2:
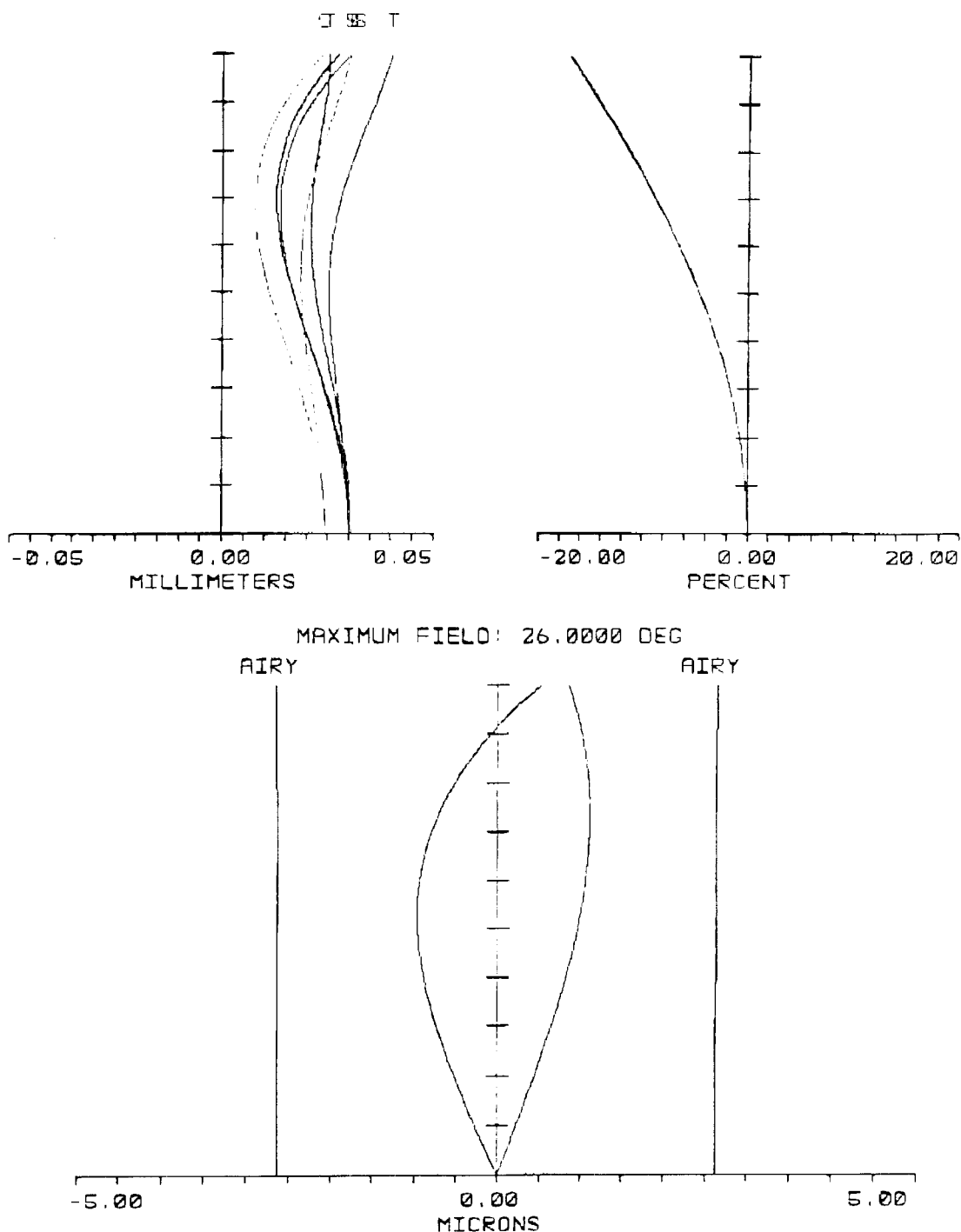
Figure 2:
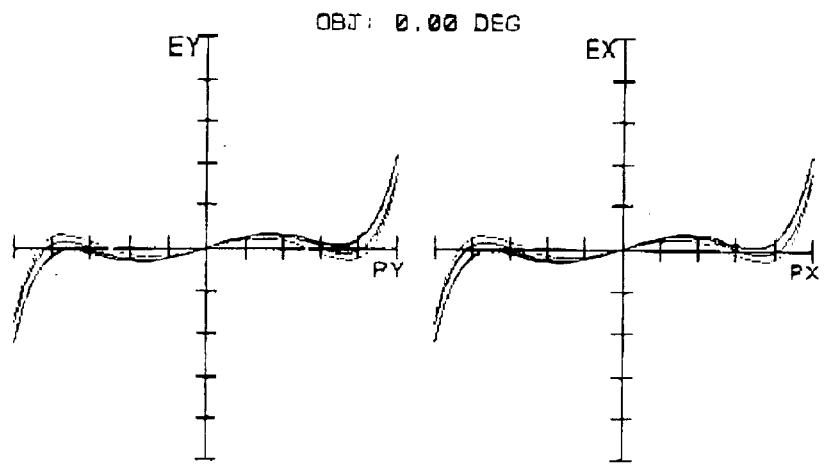
Figure 2:
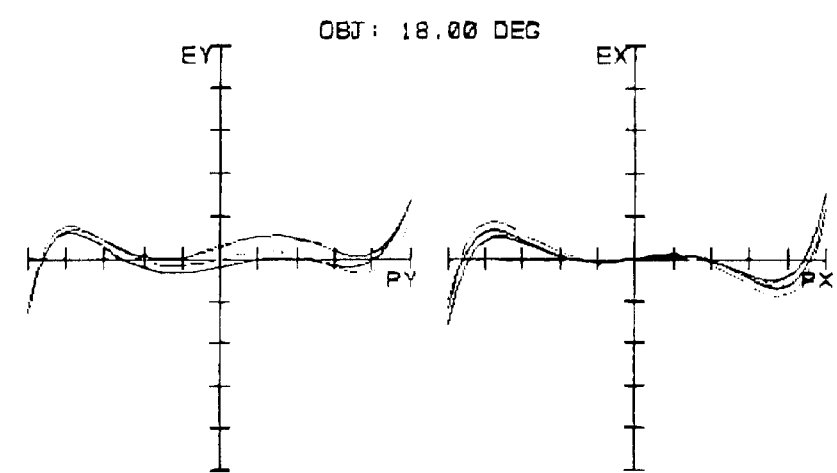
Figure 2:
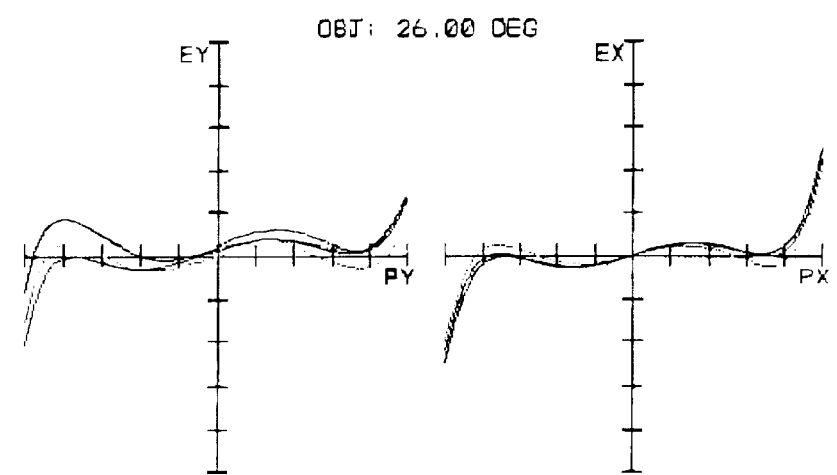

Referring to FIG. 2, light rays, in subsequent order, passing through an object 8, the retrofocus-type lens system of embodiment 1, the optical filter 5 and the image sensor 6 will focus on an image plane 7. Because the first lens unit 1 of the present invention serves as the front lens group of the retrofocus lens system, the lateral color is effectively corrected. Furthermore, the third lens unit 4 can effective correct the astigmatism, and the sixth lens elements 42 thereof can provide correction of filed curvature. As shown in FIG. 2-1, the field curvature in both the sagittal S and tangential T planes, the distortion and the transverse lateral color wherein green light is used as a reference to indicate both blue light and red light are located within the diffraction limited circle by Airy Disk. Furthermore, considering the reference image points 71, 72, 73 formed on the image plane 7 by light rays passing through an object 8 at the positions the optical axis 9, seven-tenths of the object 8 from the optical axis 9 and the edge of the object 8, the ray fan plots corresponding to the points 71, 72, 73 of the embodiment of table 1 are shown in FIG. 2-2.

Embodiment 2

The data listed in Table 2 below represent the surface number S in order from the object side, the radius of curvature R (in mm) of each said surface, the refractive index ($N_d$) and Abbe number ($V_d$) of each lens element according to embodiment 2 of the present invention. The data below Table 2 represent the focal length of the lens, the F-number value (F/No.) and the image angel 2w, as well as the specific values obtained for the above-mentioned conditions of this embodiment.

TABLE 2

| S | R | $N_d$ | $V_d$ |
|---|---|---|---|
| 1 | −6.888 | 1.6889 | 31.2 |
| 2 | −8.413 | | |
| 3 | −4.939 | 1.4978 | 66.9 |
| 4 | −11.356 | | |
| 5 | 10.471 | 1.6127 | 58.6 |
| 6 | −4.496 | | |
| 7 | −3.993 | 1.7552 | 27.6 |
| 8 | −6.505 | | |
| 9 | 4.629 | 1.5638 | 60.8 |
| 10 | −5.850 | | |

TABLE 2-continued

| S | R | $N_d$ | $V_d$ |
|---|---|---|---|
| 11 | −4.813 | 1.5891 | 30.1 |
| 12 | 21.458 | | |

| f = 6.00 | F/NO. = 2.2 |
|---|---|
| 2w = 52 degrees | f1/f = −2.48 |
| f2/f = 1.39 | f3/f = 6.71 |

As clearly shown in Table 2, the retrofocus-type lens system for the digital cameras relating to this embodiment satisfies all the above-mentioned conditions; the total length of this embodiment is only 18.21 mm; the largest F-number value is 2.2 (thus even better controlling for image exposure); and the image angle 2w is 52 degrees of wide angle.

Figure 3:
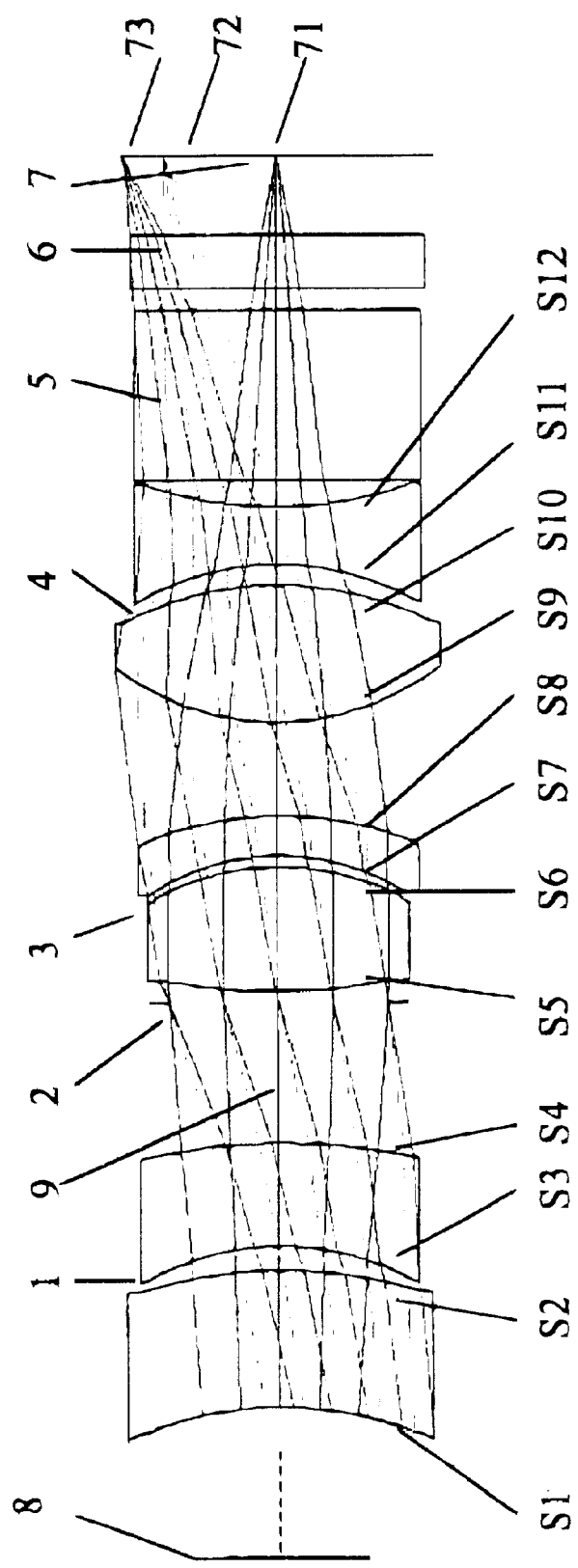
FIG. 3 shows a ray tracing diagram according to embodiment 2 of the present invention, wherein the reference image points focused on an image plane are taken from the light rays passing through an object at the positions of the optical axis, seven-tenths of the object measured from the optical axis and the edge of the object.
Figures 1, 3:
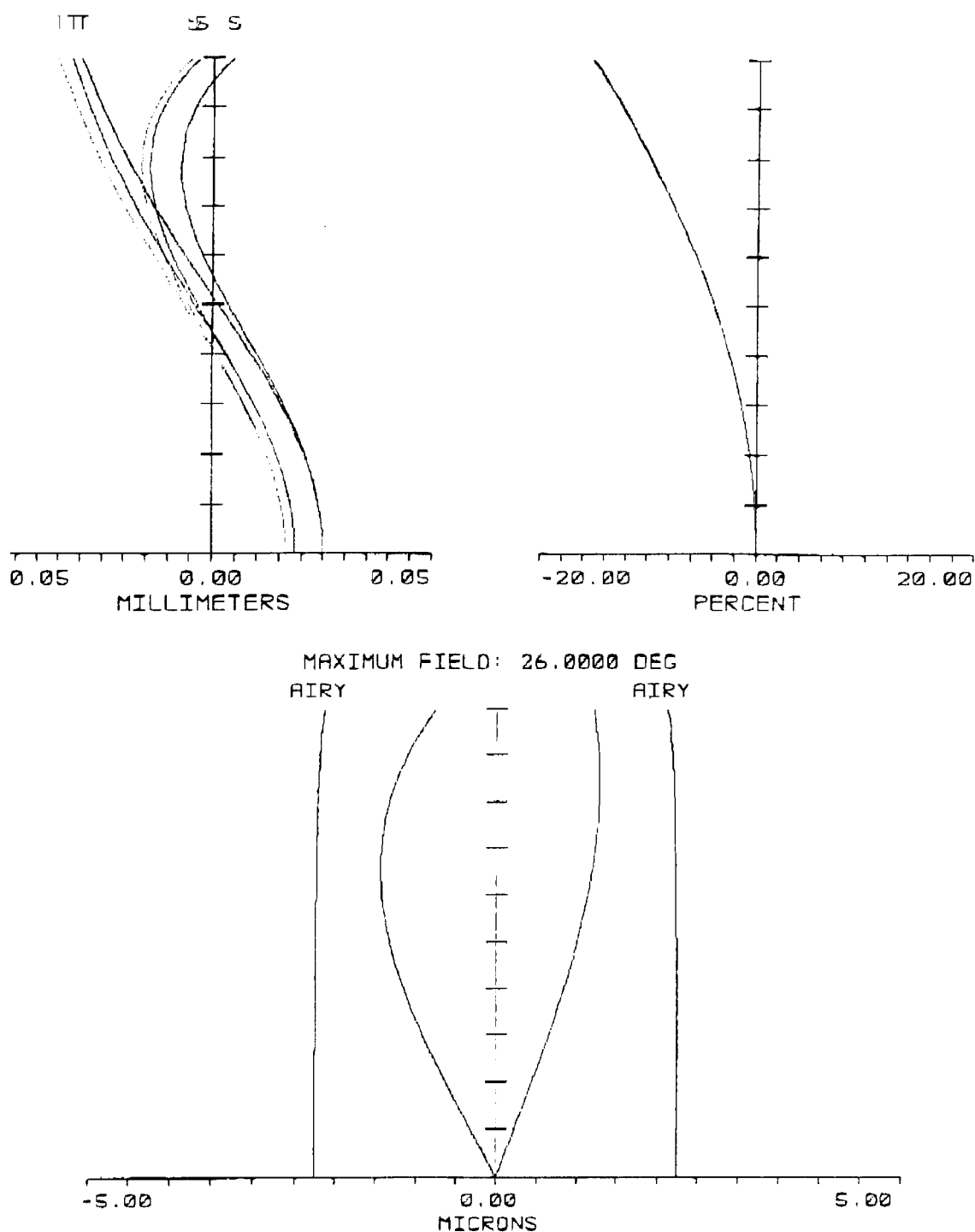
Figures 2, 3:
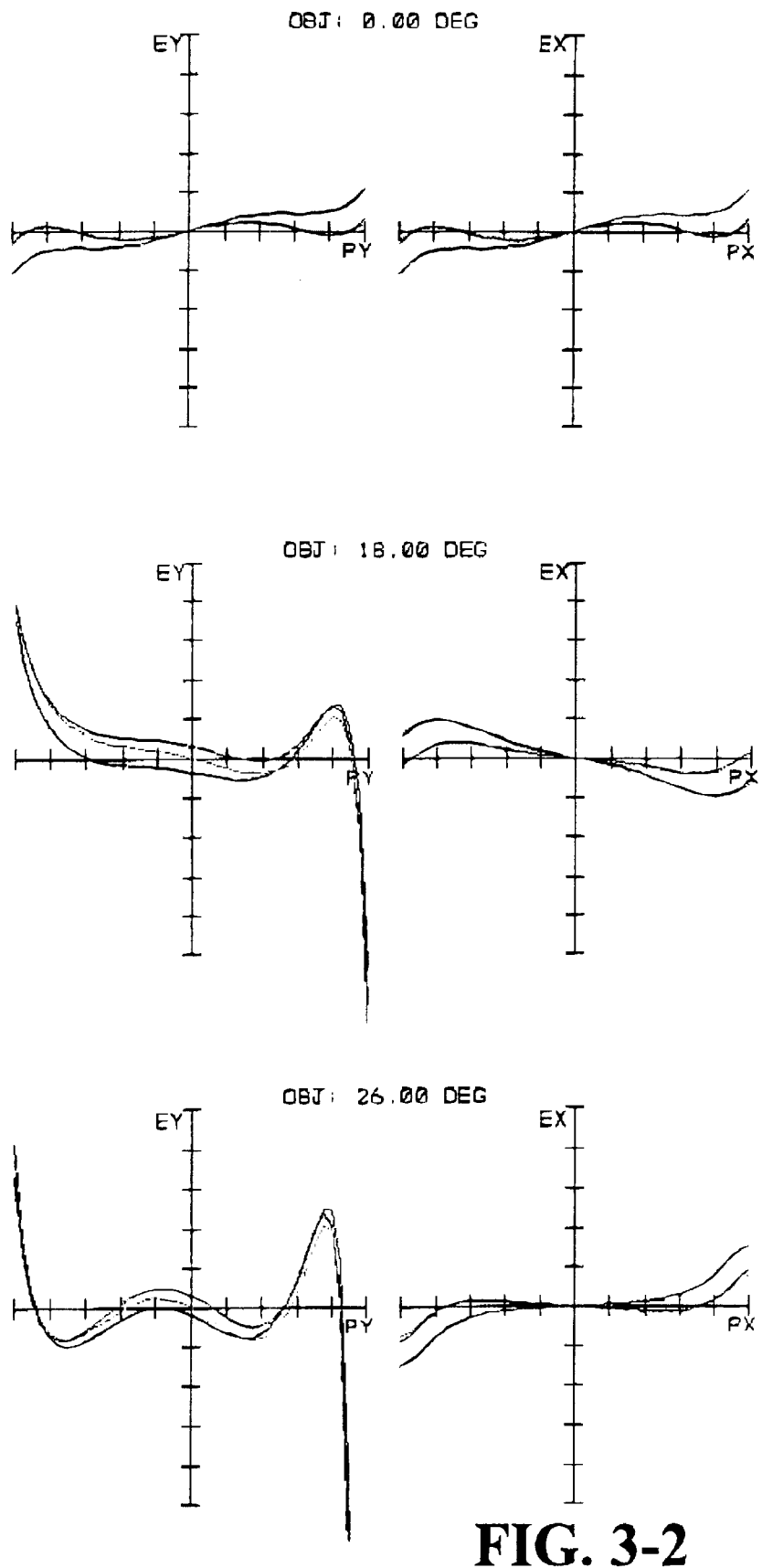

Referring to FIG. 3, similar to embodiment 1, light rays, in subsequent order, passing through an object 8, the type-type lens system of embodiment 1, the optical filter 5 and the image sensor 6 will focus on an image plane 7. The lateral color can be effectively corrected. Furthermore, the filed curvature is effective corrected by the manner similar to embodiment 1. The field curvature in both the sagittal S and tangential T planes, the distortion and the transverse lateral color of this embodiment are shown in FIG. 3-1,. Furthermore, considering the reference image points 71, 72, 73 formed an the image plane 7 by light rays passing through an object 8 at the positions the optical axis 9, seven-tenths of the object 8 for the optical axis and the edge of the object 8, the ray fan plots corresponding to the points 71, 72, 73 of the embodiment of table 2 are shown in FIG. 3-2.

Embodiment 3

The data listed in Table 3 below represent the surface number S in order from the object side, the radius of curvature R (in mm) of each said surface, the refractive index ($N_d$) and Abbe number ($V_d$) of each lens element according to embodiment 3 of the present invention. The data below Table 3 represent the focal length of the lens, the F-number value (F/No.) and the image angel 2w, as well as the specific values obtained for the abovementioned conditions of this embodiment.

TABLE 3

| S | R | $N_d$ | $V_d$ |
|---|---|---|---|
| 1 | −8.951 | 1.8467 | 23.6 |
| 2 | −9.719 | | |
| 3 | −4.650 | 1.5638 | 60.8 |
| 4 | −26.046 | | |
| 5 | 9.587 | 1.5168 | 64.2 |
| 6 | −4.196 | | |
| 7 | −3.598 | 1.7552 | 27.2 |
| 8 | −5.385 | | |
| 9 | 4.940 | 1.6209 | 60.3 |
| 10 | −9.871 | | |
| 11 | −4.628 | 1.8467 | 23.6 |
| 12 | ∞ | | |

| f = 5.59 | F/NO. = 2.2 |
|---|---|
| 2w = 52 degrees | f1/f = −1.68 |
| f2/f = 1.67 | f3/f = 2.66 |

As clearly shown in Table 3, the retrofocus-type lens system for the digital cameras relating to this embodiment satisfies all the above-mentioned conditions; the total length of this embodiment is merely 18.10 mm; the largest F-number value is 2.2 (thus better controlling for image exposure); and the image angle 2w is 52 degrees of wide angle.

Figure 4:
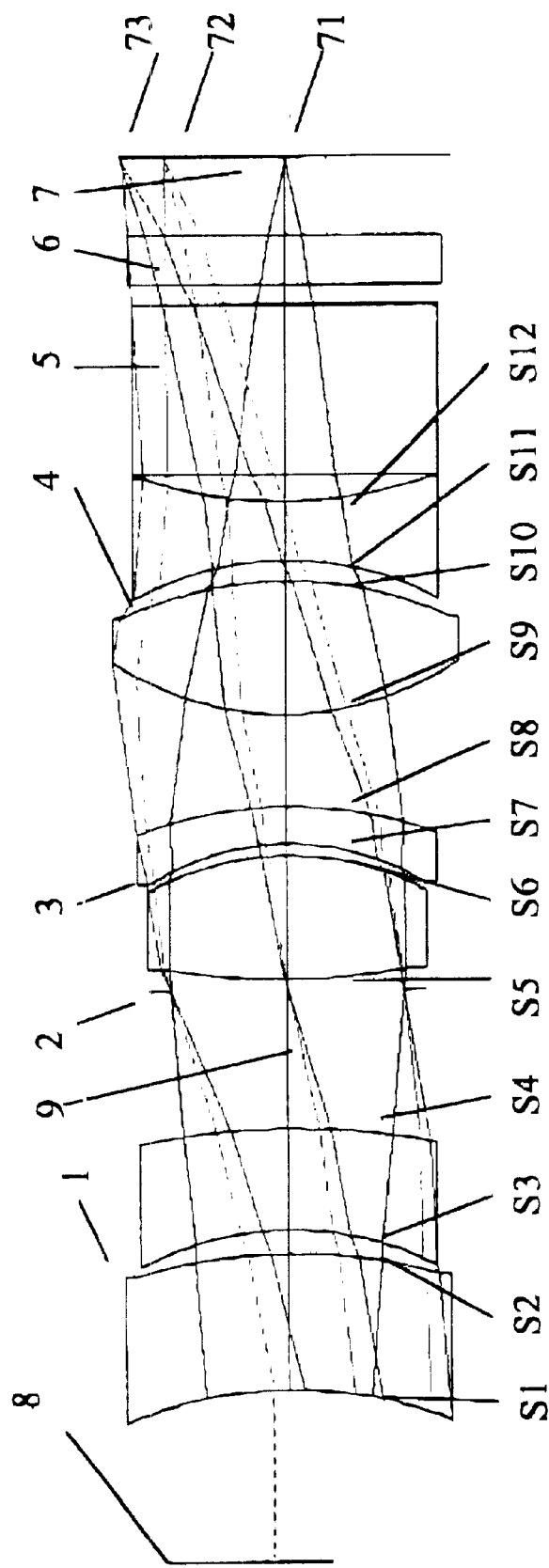
FIG. 4 shows a ray tracing diagram according to embodiment 3 of the present invention, wherein the reference image points focused on an image plane are taken from the light rays passing through an object at the positions of the optical axis, seven-tenths of the object measured from the optical axis and the edge of the object.
Figures 1, 4:
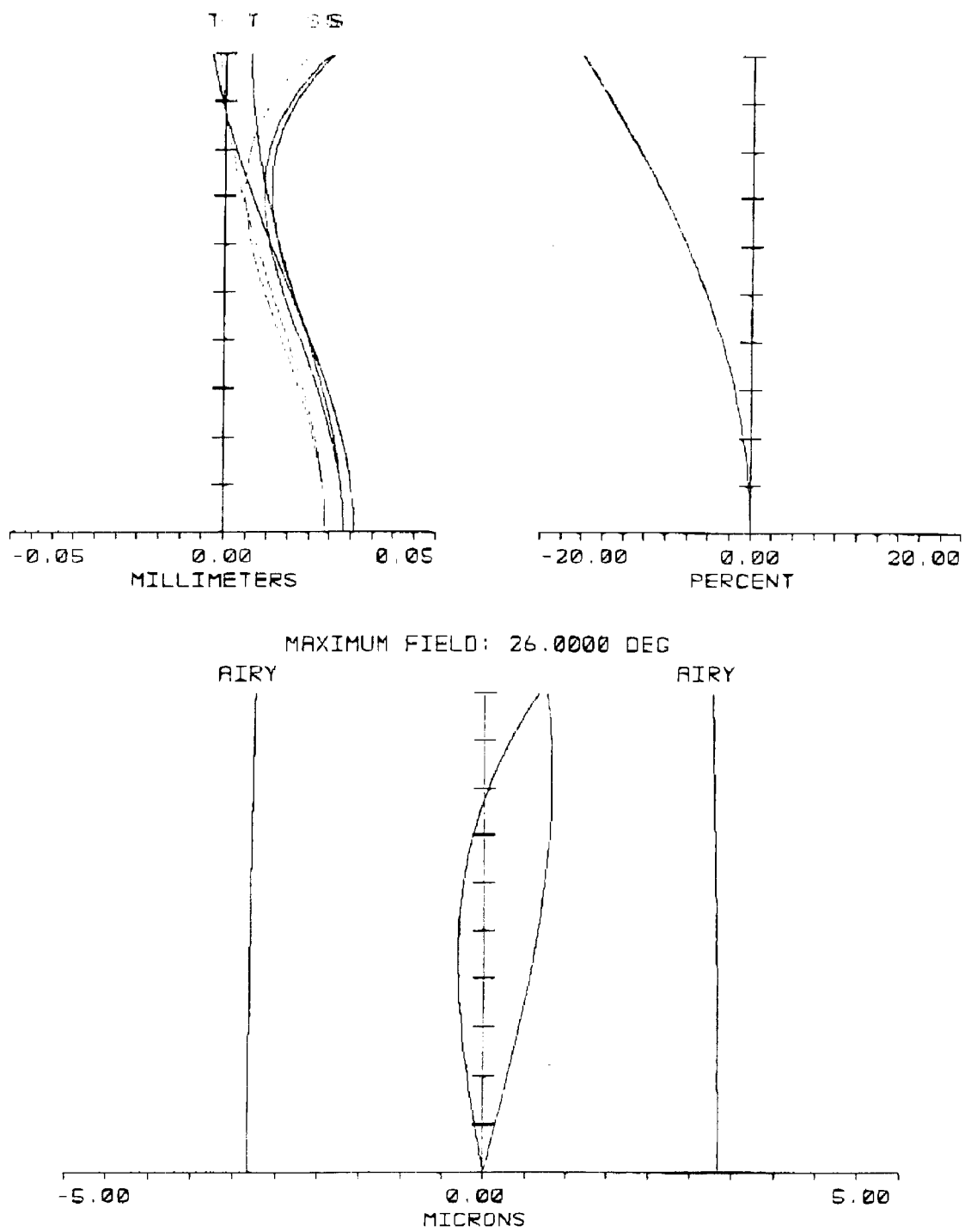
Figures 2, 4:
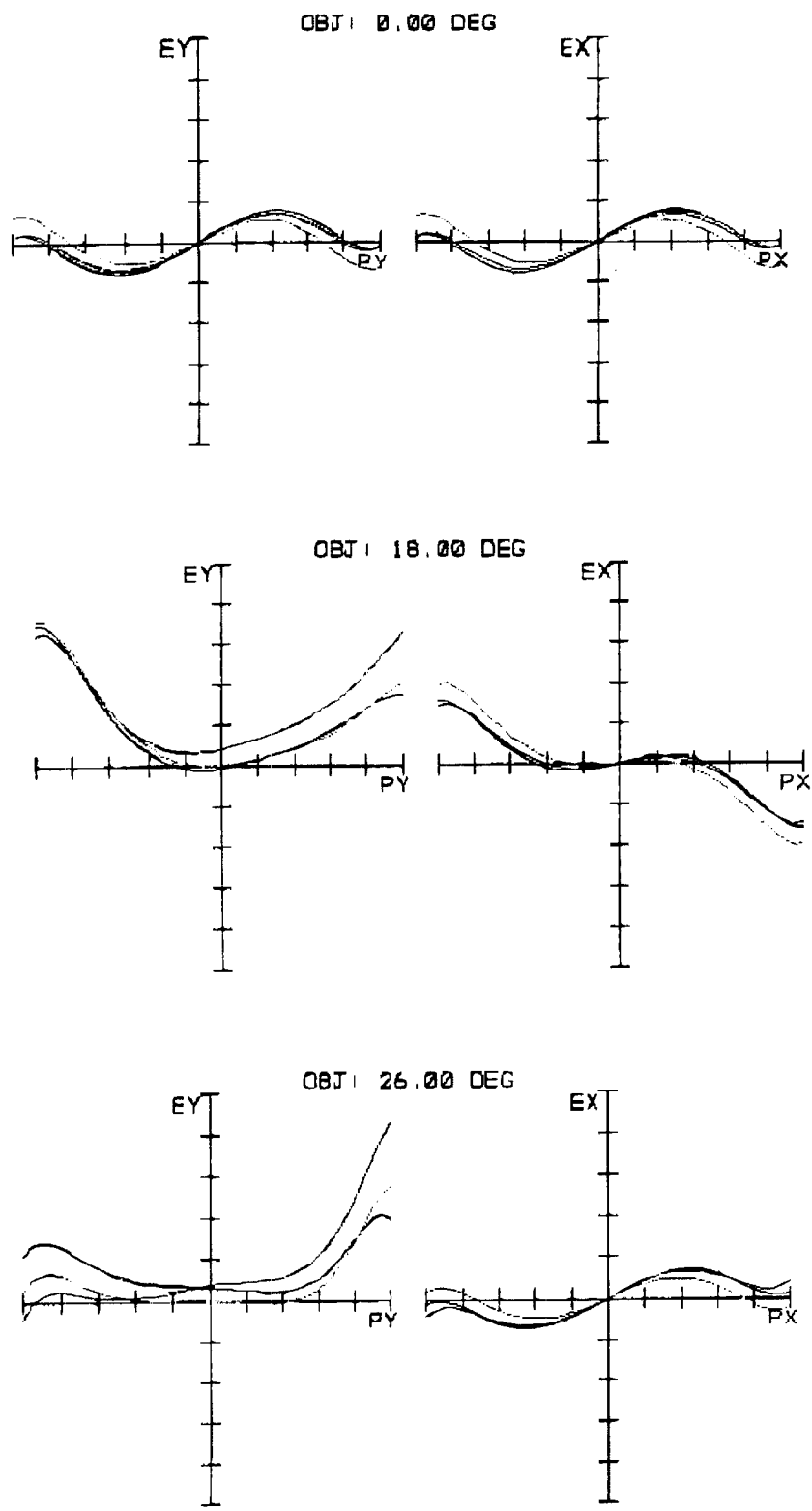

Referring to FIG. 4, similar to embodiments 1 and 2, the image distortion such as the lateral color and the filed curvature can be effectively corrected. FIG. 4-1 shows the field curvature in both the sagittal S and tangential T planes, the distortion and the transverse lateral color, respectively Furthermore, considering the reference image points 71, 72, 73 formed on the image plane 7 by light rays passing through an object 8 at the positions the optical axis 9, seven-tenths of the object 8 from the optical axis 9 and the edge of the object 8, the ray fan plots corresponding to the points 71, 72, 73 of the embodiment of table 3 are shown in FIG. 4-2.

The invention being thus described, it will be obvious that the same may be varied in many ways. For example, although the various lens elements are illustrated as a single lens component in the drawings, one or more of these lens elements may instead be formed of two or more lenses chat are joined. Further, the lens elements of each of the lens unit can be combined if necessary. In addition, although spherical lens elements are preferred to save manufacture cost, one or more lens surfaces maybe made aspherical. Such variations are not to be regarded as a departure from the spirit of this invention Rather, the scope of the present invention shall be defined asset forth in the following claims and their legal equivalents All such modifications as would be obvious to those of skill in the art are intended to be included within the scope of the following claims.

What is claimed is:

1. A retrofocus-type lens system comprising, in subsequent order from the most object side:

a first lens unit, a stop, a second lens unit, and a third lens unit, wherein said first lens unit is of negative refractive power and said second lens unit in combination with said third lens unit is of positive refractive power, and the following conditions are satisfied:

−2.7<f1/f<−1.6

1>f2/f<2

2.6<f3/f<17 where f is the effective focal length of the said retrofocus-type lens system, f1 is the focal length of said first lens unit, f2 is the focal length of said second lens unit, and f3 is the focal length of said third lens unit.

2. The lens system of claim 1, wherein said first lens unit has a meniscus lens element concave to the object side.

3. The lens system of claim 2, wherein said first lens unit has a negative meniscus lens element to the image side.

4. The lens system of claim 1, wherein said third lens unit has a negative concave lens element to the image side.

5. The lens system of claim 4, wherein said third lens unit has a lens element of approximately zero focal length.

6. The lens system of claim 1, wherein said first lens unit has a higher dispersive power lens element on the object side.

7. The lens system of claim 1, wherein said second and said third lens units have a lower dispersive power lens element on the object side, respectively.

8. A retrofocus-type lens system comprising, in subsequent order from the most object side:

a first lens unit, a stop, a second lens unit, and a third lens unit, wherein said first lens unit has a meniscus lens element of negative refractive power concave to the object side and said second lens unit in combination with said third lens unit is of positive refractive power, and the following conditions are satisfied:

$-2.7 < f1/f < -1.6$ $1 < f2/f < 2$ $2.6 < f3/f < 17$ where f is the effective focal length of the said retrofocus-type lens system, f1 is the focal length of said first lens unit, f2 is the focal length of said second lens unit, and f3 is the focal length of said third lens unit.

9. The lens system of claim 8, wherein said first lens unit has a negative meniscus lens element on the image side.

10. The lens system of claim 8, wherein said third lens unit has a lens element of approximately zero focal length.

* * * * *